(12) United States Patent
Leleannec et al.

(10) Patent No.: US 11,182,882 B2
(45) Date of Patent: Nov. 23, 2021

(54) METHOD AND DEVICE FOR TONE-MAPPING A PICTURE BY USING A PARAMETRIC TONE-ADJUSTMENT FUNCTION

(71) Applicant: INTERDIGITAL MADISON PATENT HOLDINGS, SAS, Paris (FR)

(72) Inventors: Fabrice Leleannec, Mouazè (FR); Sebastien Lasserre, Thorignè Fouillard (FR); Tangi Poirier, Rennes (FR); Edouard Francois, Bourg des Comptes (FR)

(73) Assignee: INTERDIGITAL MADISON PATENT HOLDINGS, SAS, Paris (FR)

(*) Notice: Subject to any disclaimer, the term of this patent is extended or adjusted under 35 U.S.C. 154(b) by 238 days.

(21) Appl. No.: 15/744,813

(22) PCT Filed: Jul. 7, 2016

(86) PCT No.: PCT/EP2016/066167
§ 371 (c)(1),
(2) Date: Jan. 14, 2018

(87) PCT Pub. No.: WO2017/009182
PCT Pub. Date: Jan. 19, 2017

(65) Prior Publication Data
US 2018/0211369 A1 Jul. 26, 2018

(30) Foreign Application Priority Data

Jul. 16, 2015 (EP) .................................... 15306166
Jul. 23, 2015 (EP) .................................... 15306196

(51) Int. Cl.
*G06T 5/00* (2006.01)
*G06T 5/40* (2006.01)
(Continued)

(52) U.S. Cl.
CPC ................ *G06T 5/009* (2013.01); *G06T 5/40* (2013.01); *H04N 1/4072* (2013.01); *H04N 19/30* (2014.11); *G09G 2320/066* (2013.01)

(58) Field of Classification Search
CPC ......... H04N 19/30; H04N 1/4072; G06T 5/40
See application file for complete search history.

(56) References Cited

U.S. PATENT DOCUMENTS

| 4,831,434 A | 5/1989 | Fuchsberger |
| 2004/0184673 A1 | 9/2004 | Watanabe |

(Continued)

FOREIGN PATENT DOCUMENTS

| CN | 1572118 A | 1/2005 |
| CN | 104471939 A | 3/2015 |

(Continued)

OTHER PUBLICATIONS

Goris et al., "Philips response to CfE for HDR and WCG", International Organisation for Standardisation, Coding of Motion Pictures and Audio, ISO/IEC JTC1/SC29/WG11 MPEG 2015/M36266, Warsaw, Poland, Jul. 2015, pp. 1-5.

(Continued)

*Primary Examiner* — Edward Park
(74) *Attorney, Agent, or Firm* — Invention Mine LLC

(57) ABSTRACT

The present principles relates to a method and device for tone-mapping an input picture by using a parametric tone-adjustment function. The method is characterized in that the method comprises determining at least one parameter of said tone-adjustment function modulated by a brightness level of the input picture.

24 Claims, 6 Drawing Sheets

(51) Int. Cl.
*H04N 1/407* (2006.01)
*H04N 19/30* (2014.01)

(56) References Cited

U.S. PATENT DOCUMENTS

| | | | |
|---|---|---|---|
| 2004/0263637 | A1 | 12/2004 | Serizawa et al. |
| 2006/0171601 | A1 | 8/2006 | Shinbata |
| 2009/0295937 | A1 | 12/2009 | Sato et al. |
| 2010/0053384 | A1 | 3/2010 | Manabe |
| 2010/0295977 | A1 | 11/2010 | Manabe |
| 2013/0278830 | A1 | 10/2013 | Noutoshi et al. |
| 2015/0201222 | A1 | 7/2015 | Mertens |

FOREIGN PATENT DOCUMENTS

| | | |
|---|---|---|
| DE | 3629403 C2 | 9/1994 |
| EP | 0377386 | 12/1989 |
| EP | 1400921 | 3/2004 |
| JP | 2000137805 A | 5/2000 |
| JP | 2010009583 A | 1/2010 |
| JP | 2010056774 A | 3/2010 |
| JP | 2010272996 A | 12/2010 |
| JP | 2010278890 A | 12/2010 |
| JP | 2012178809 A | 9/2012 |
| KR | 20140038566 A | 3/2014 |
| RU | 2436172 C1 | 12/2011 |
| WO | 2009081826 A1 | 7/2009 |
| WO | 2016124451 A1 | 8/2016 |

OTHER PUBLICATIONS

Lasserre et al., "Technicolor's response to CfE for HDR and WCG (Catagory 1)—Single Layer HDR video coding with SDR backward compatibility", International Organisation for Standardisation, Coding of Motion Pictures and Audio, ISO/IEC JTC1/SC29/WG11 MPEG 2014/M36263, Warsaw, Poland, Jul. 2015, pp. 1-20.

Luthra et al., "Call for Evidence (CfE) for HDR and WCG Video Coding", International Organisation for Standardisation, Coding of Motion Pictures and Audio, ISO/IEC JTC1/SC29/WG11 MPEG 2014/N15083, Geneva, Switzerland, Feb. 2015, pp. 1-46.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-15.

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Anonymous, "Advanced video coding for generic audiovisual Services", ITU-T H.264, Telecommunication Standardization Sector of ITU, Series H: Audiovisual and Multimedia Systems, Infrastructure of audiovisual services—Coding of moving video, Feb. 2014, pp. 1-790.

KR 20140038566 A, Translated "Image processing for hdr images" Mar. 28, 2014.

RU 2436172 C1, Translated "Methods for determining parameter of adjustment curve of tonal range and methods for selecting illumination level of display light source" Dec. 10, 2011.

JP2010009583 A, Translated "Dynamic Range Compression Apparatus, Dynamic Range Compression Method, Program, Integrated Circuit and Imaging Apparatus" Jan. 14, 2010.

JP2010272996 A, Translated "Image Processor and Image Processing Program" Dec. 2, 2010.

JP2010056774 A, Translated "Apparatus, Method and Program for Processing Image" Mar. 11, 2010.

JP2012178809 A, Translated "Video Display Device" Sep. 13, 2012.

JP2010278890 A, Translated "Image Forming Apparatus, and Image Forming Method" Dec. 9, 2010.

JP2000137805 A, Translated "Processor and Method for Image Processing" May 16, 2000.

SMPTE Standard—Mastering Display Color Volume Metadata Supporting High Luminance and Wide Color Gamut Images, in ST 2086:2014, pp. 1-6, 2014.

Nijland, R. "Philips HDR proposal Dynamic range conversion in relation to the "Unified Model" as discussed in SMPTE DG Dynamic Metadata for Color Transforms of HDR and WCG Images" Version 1.5: Starwatcher Digital, Jim Houston, 20 pages, Mar. 17, 2015.

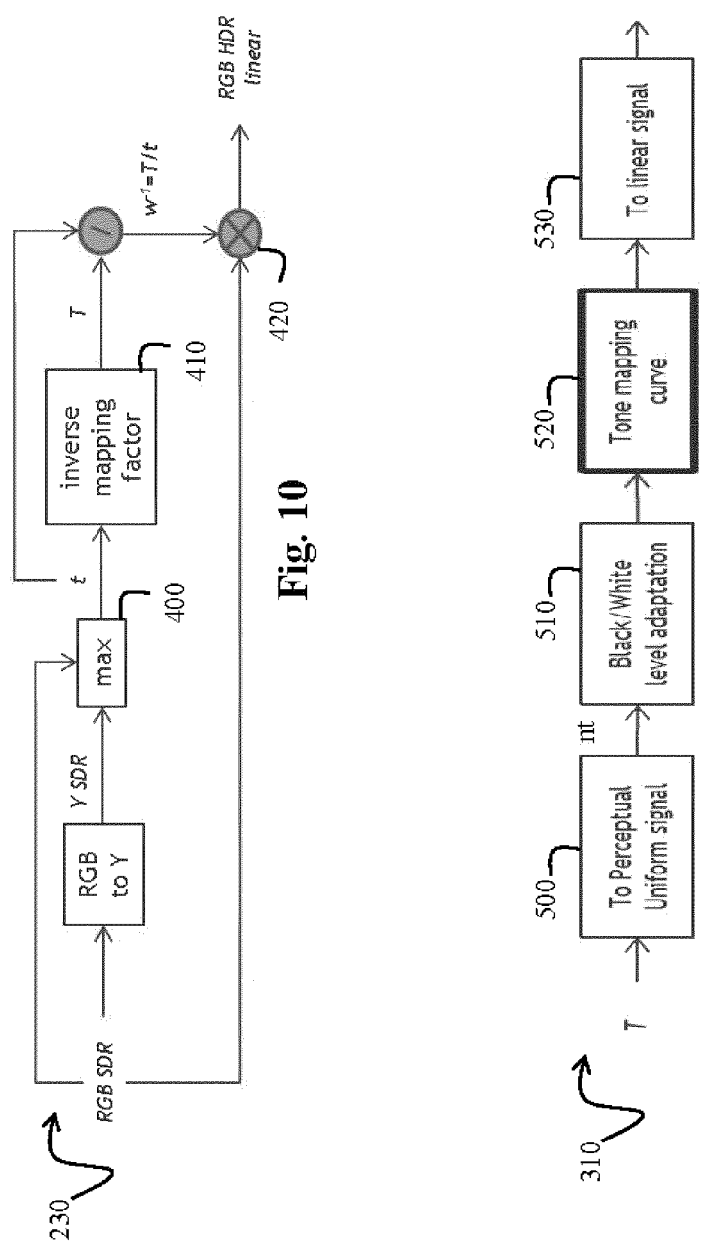

METHOD AND DEVICE FOR TONE-MAPPING A PICTURE BY USING A PARAMETRIC TONE-ADJUSTMENT FUNCTION

This application claims the benefit, under 35 U.S.C. § 365 of International Application PCT/EP2016/066167, filed Jul. 7, 2016, which was published in accordance with PCT Article 21(2) on Jan. 19, 2017, in English, and which claims the benefit of European Patent Application No. 15306166.8, filed on Jul. 16, 2015 and European Patent Application No. 15306169.5, filed on Jul. 23, 2015.

1. FIELD

The present principles generally relate to picture/video tone-mapping. Particularly, but not exclusively, the technical field of the present principles are related to tone-mapping a picture whose pixels values belong to a high-dynamic range.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 f-stops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OEFT (Optico-Electrical-Transfer-Function) (Rec. ITU-R BT.709-5, April 2002) or ITU-R BT.2020 OETF (Rec. ITU-R BT.2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits. More compact representation do exist like, for instance, the 10 or 12 bit format obtained by using the so-called PQ OETF defined in SMPTE 2084 (*SMPTE standard: High Dynamic Range Electro-Optical Transfer Function of Mastering Reference Displays, SMPTE ST* 2084:2014).

Tone-mapping is a well-known operation that reduces the dynamic range of an input picture.

A tone-mapping operation may be implemented as a tone adjustment function which determines an output SDR value for each input HDR value or reciprocally.

FIG. 1 shows an example of a tone-adjustment function (represented graphically by a curve) as defined in "*Philips HDR proposal Dynamic range conversion in relation to the "Unified Model" as discussed in SMPTE DG "Dynamic Metadata for Color Transforms of HDR and WCG Images*" R. Nijland Koninklijke Philips N.V. 20150421.

The tone-adjustment function is a parametric tone-adjustment function defined on three ranges (time intervals): the bottom interval, the mid-interval and the upper interval.

Over the bottom interval, the tone-adjustment function is linear: y=SGC*x with SGC a real parameter value, y an output value and x an input value.

Over the upper interval, the tone-adjustment function is also linear: y=HGC*x+(1−HGC) with HGC a slope (real parameter value).

Over the mid-interval, the tone-adjustment function is a parabola $ax^2+bx+c$, $x_{SGC}$ connecting the two linear intervals in a smooth cross-over. The width of the cross-over is determined by MTA, a real parameter value.

$$y = \begin{cases} SGC \cdot x, \ 0 \leq x \leq x_{SGC} \\ ax^2 + bx + c, \ x_{SGC} < x < x_{HGC} \\ HGC \cdot x + 1 - HGC, \ x_{HGC} \leq x \leq 1 \end{cases} \quad (1)$$

where $$\begin{cases} a = -0.5 \cdot SGC - HGC \ MTA \\ b = \dfrac{1 - HGC}{MTA} + \dfrac{SGC + HGC}{2} \\ c = \dfrac{1 - HGC}{SGC - HGC} + \dfrac{MTA}{2} \end{cases} \quad (2)$$

and $$\begin{cases} x_{SGC} = \dfrac{1 - HGC}{SGC - HGC} - \dfrac{MTA}{2} \\ x_{HGC} = \dfrac{1 - HGC}{SGC - HGC} + \dfrac{MTA}{2} \end{cases} \quad (3)$$

According to this prior art, the parameters SGC, HGC and MTA parameter values depend on the three input parameter values shadowGainControl, midTonesAdjustement and highlightGainControl as follows:

$$\begin{cases} \text{exposure} = \dfrac{shadowGainControl}{4} + 0,5 \\ expgain = v\left(\dfrac{L_{source}}{L_{target}}\right) \\ SGC = expgain.\,exposure \\ HGC = \dfrac{highLightGainControl}{4} \\ MTA = \dfrac{midTonesAdjustement}{2} \end{cases} \quad (4)$$

$$\text{with } v(x) = \dfrac{\log\left(1 + (\rho - 1).x^{\frac{1}{\gamma}}\right)}{\log(\rho)} \text{ and } \rho = 1 + 32.\left(\dfrac{L_{target}}{10000}\right)^{1/\gamma}$$

For example, in the above equations, $L_{target}$ is equal to 100 nits, $L_{source}$ is preferably equal to 4000 nits or 5000 nits and the function v is the identity function.

As a consequence, three input parameters shadowGainControl, highLightGainControl and midTonesAdjustement have to be given to specify the tone-adjustment function, which is piecewise linear and parabolic.

The present disclosure is not limited to a specific parametric tone adjustment function.

The input parameters specifying a parametric tone-adjustment function may be manually chosen according to one's artistic intent but this makes it difficult to configure an automated tone-mapping method in a proper and robust way across many video contents for defining these parameters.

3. SUMMARY

The following presents a simplified summary of the present principles in order to provide a basic understanding of some aspects of the present principles. This summary is not an extensive overview of the present principles.

It is not intended to identify key or critical elements of the present principles. The following summary merely presents some aspects of the present principles in a simplified form as a prelude to the more detailed description provided below.

The present principles set out to remedy at least one of the drawbacks of the prior art with a method for tone-mapping an input picture by using a parametric tone-adjustment function defined over multiple ranges, at least one parameter of the tone-adjustment function being associated to each range. The method comprises defining a non-linear tone adjustment function over at least one range, and determining at least one parameter of said tone-adjustment function modulated by a brightness level of the input picture.

In accordance with an example of the present principles, the tone adjustment function is defined over three ranges.

In accordance with an example of the present principles, the tone adjustment function is linear over a first range, parabolic over a second range and linear over a third range.

In accordance with an example of the present principles, the tone adjustment function is defined:
  over the first range by:

y=SGC*x with SGC a real parameter value, y an output value and x an input value;
  over the second range by:

$ax^2+bx+c, x_{SGC}<x<x_{HGC}$ over the third range by:

y=HGC*x+(1−HGC)

with HGC a slope;

where $$\begin{cases} a = -0.5 \cdot SGC - HGC\,MTA \\ b = \dfrac{1-HGC}{MTA} + \dfrac{SGC+HGC}{2} \\ c = \dfrac{1-HGC}{SGC-HGC} + \dfrac{MTA}{2} \end{cases}$$

$$\begin{cases} x_{SGC} = \dfrac{1-HGC}{SGC-HGC} - \dfrac{MTA}{2} \\ x_{HGC} = \dfrac{1-HGC}{SGC-HGC} + \dfrac{MTA}{2} \end{cases}$$

with MTA, a real parameter value and $$\begin{cases} \text{exposure} = \dfrac{shadowGainControl}{4} + 0,5 \\ expgain = v\left(\dfrac{L_{source}}{L_{target}}\right) \text{ with } v \text{ a function based on } L_{target} \\ SGC = expgain.exposure \\ HGC = \dfrac{highLightGainControl}{4} \\ MTA = \dfrac{midTonesAdjustement}{2} \end{cases}$$

$$\text{with } v(x) = \dfrac{\log\left(1 + (\rho - 1).x^{\frac{1}{\gamma}}\right)}{\log(\rho)} \text{ and } \rho = 1 + 32.\left(\dfrac{L_{target}}{10000}\right)^{1/\gamma}$$

where shadowGainControl, and midTonesAdjustement are real values given by:

$$\begin{cases} shadowGainControl = 0.229 + 2.47 * \exp(-0.333 * Ba) \\ midTonesAdjustement = 2.21 * \exp(-0.16 * Ba) \end{cases}$$

where highlightGainControl is a real value and a modulation value Ba responsive to a brightness level of the input picture and expressed in nits.

In accordance with an example of the present principles, the real value highlightGainControl is a constant value.

In accordance with an example of the present principles, the real value highlightGainControl is kept as another parameter in addition to the modulation value.

In accordance with an example of the present principles, the real value highlightGainControl is given by:

highlightGainControl=2−2*exp(−0.26/Ba)

In accordance with an example of the present principles, the tone adjustment function is defined:
  over the first range by:

$$y = SGC' * \dfrac{x}{Ba}$$

with SGC a real parameter value, y an output value and x an input value;
  over the second range by:

$$y = a'\left(\dfrac{x}{Ba}\right)^2 + b'\dfrac{x}{Ba} + c'$$

over the third range by:

$$y = HGC' * \frac{x}{Ba} + \left(1 - \frac{HGC'}{Ba}\right)$$

with HGC a slope;
where $$\begin{cases} a' = Ba.(-0.5 \cdot SGC' - HGC'.MTA') \\ b' = \frac{Ba - HGC'}{MTA'} + \frac{SGC' + HGC'}{2} \\ c' = \frac{Ba - HGC'}{SGC' - HGC'} + \frac{MTA'}{2} \end{cases}$$

$$\begin{cases} x'_{SGC} = \frac{B_a - HGC'}{SGC' - HGC'} - \frac{MTA'}{2} \\ x'_{HGC} = \frac{B_a - HGC'}{SGC' - HGC'} - \frac{MTA'}{2} \end{cases}$$

with MTA, a real parameter value and $$\begin{cases} expgain = v\left(\frac{L_{source}}{L_{target}}\right) \\ SGC' = expgain \\ HGC' = \frac{highLightGainControl}{4} \\ MTA' = \frac{midTonesAdjustment}{2} \end{cases}$$

with $v(x) = \frac{\log\left(1 + (\rho - 1).x^{\frac{1}{\gamma}}\right)}{\log(\rho)}$ and $\rho = 1 + 32.\left(\frac{L_{target}}{100000}\right)^{1/\gamma}$ where midTonesAdjustement is a real value given by:

$$\begin{cases} midTonesAdjustement = 2.21 * \exp(-0.16 * Ba) \\ highlightGainControl = CST \end{cases}$$

where highlightGainControl is a real value and a modulation value Ba responsive to a brightness level of the input picture and expressed in nits.

In accordance with an example of the present principles, the tone-adjustment function is a parametric logarithm function defined by:

$$ba_N = Ba/PeakL$$

$$N = \log\left(1 + \frac{1}{k.ba_N}\right)$$

$$y = \frac{\log\left(1 + \frac{x}{k.ba_N}\right)}{N}, \forall x \in [0, 1]$$

with k a constant value, y an output value and x an input value and PeakL the peak luminance value of the input picture.

In accordance with an example of the present principles, the modulation value is responsive to a mid-tone level of the input picture.

In accordance with an example of the present principles, the mid-tone level is determined based on a black level and a white level.

In accordance with an example of the present principles, the mid-tone level is determined as one of (1) a geometric mean and (2) a logarithm mean of the black level and the white level.

In accordance with an example of the present principles, the input image is one of a plurality of pictures included in a video sequence, and wherein the determining of the modulation value is performed for each of the plurality of pictures, wherein the modulation values for the plurality of pictures are temporally smoothed.

According to another of its aspects, the present disclosure relates to a method for inverse-tone-mapping a tone-mapped version of an input picture by using a parametric inverse-tone-adjustment function defined over multiple ranges, at least one parameter of the tone-adjustment function being associated to each range. The method is characterized in that the method comprises defining a non-linear tone adjustment function over at least one range, and obtaining at least one parameter of the inverse-tone-adjustment function modulated by a brightness level of the input picture.

According to another of its aspects, the present disclosure relates to a method for encoding an input picture comprising:
obtaining a maximum value from the component values of the input picture;
obtaining a linear value by tone-mapping said maximum value according to a above method;
multiplying the input picture by a ratio between the linear value over the maximum value.

According to another of its aspects, the present disclosure relates to a method for decoding a picture comprising:
obtaining a maximum value from the component values of a decoded picture;
obtaining a non-linear value by inverse-tone-mapping said maximum value according to a above method;
multiplying the decoded picture by a ratio between the non-linear value over the maximum value.

According to another of its aspects, the present disclosure relates to a device for tone-mapping an input picture by using a parametric tone-adjustment function defined over multiple ranges, at least one parameter of the tone-adjustment function being associated to each range, characterized in that the device comprises a processor configured to define a non-linear tone adjustment function over at least one range, and determine at least one parameter of said tone-adjustment function modulated by a brightness level of the input picture.

According to another of its aspects, the present disclosure relates to a device for encoding an input picture comprising a processor configured to:
obtain a maximum value from the component values of the input picture;
obtain a linear value by tone-mapping said maximum value according to a above method;
multiply the input picture by a ratio between the linear value over the maximum value.

According to another of its aspects, the present disclosure relates to a device for decoding a picture comprising a processor configured to:
obtain a maximum value from the component values of a decoded picture;
obtain a non-linear value by inverse-tone-mapping said maximum value according to a above method;

multiply the decoded picture by a ratio between the non-linear value over the maximum value.

According to another of its aspects, the present disclosure relates to a signal carrying an encode picture, characterized in that it further carries an information data indicating a modulation value responsive to a brightness level of the encoded input picture.

According to other of their aspects, the present principles relate to a computer program product comprising program code instructions to execute the steps of the above method when this program is executed on a computer, and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows:

Figure 4:
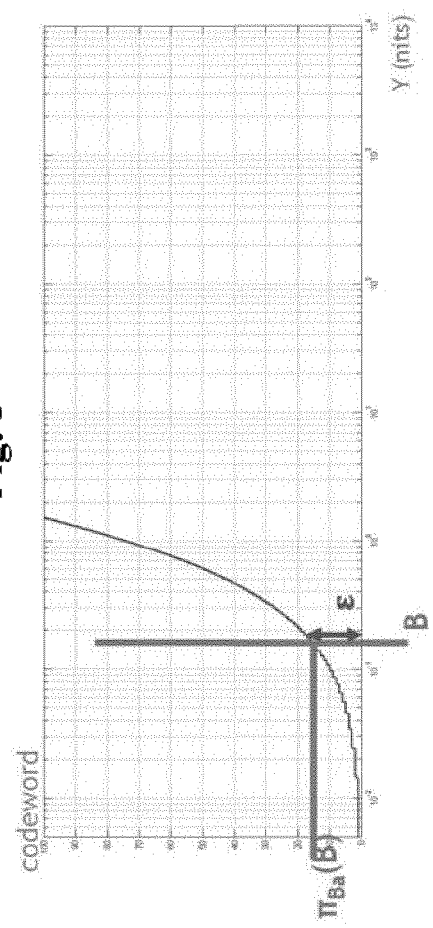
Figure 5:
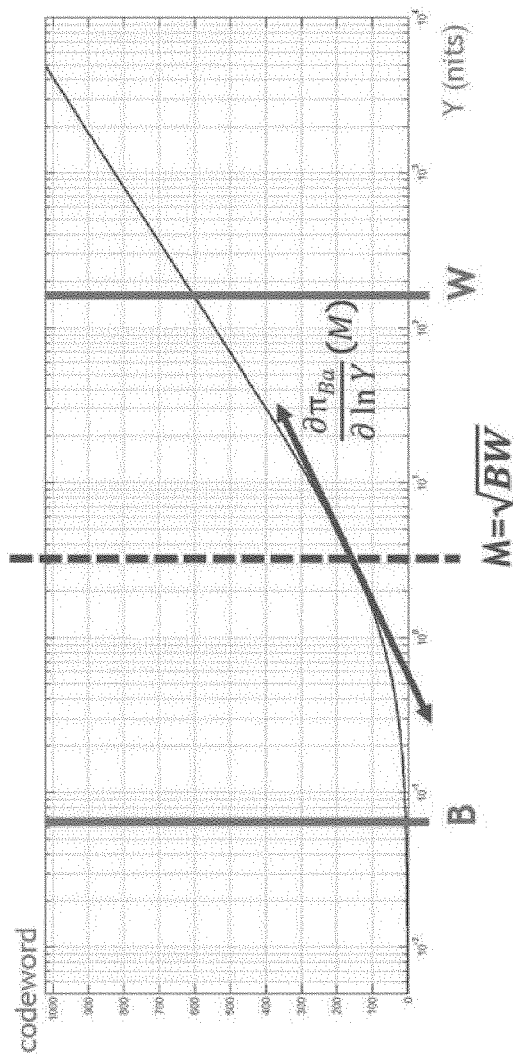
Figure 6:
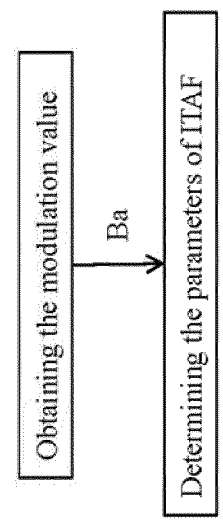
Figure 7:
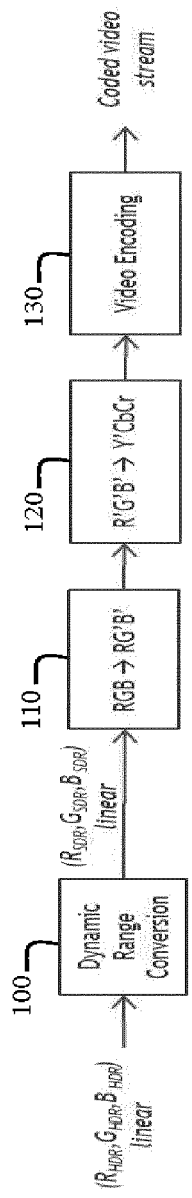
Figure 8:
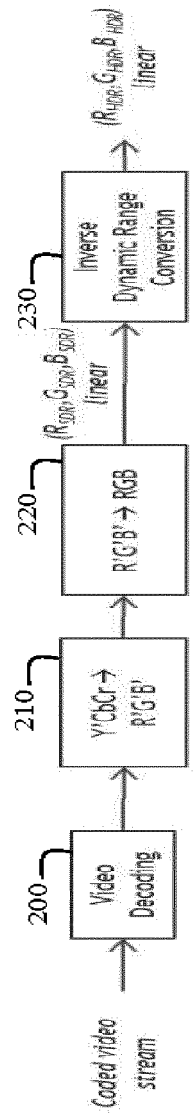
Figure 9:
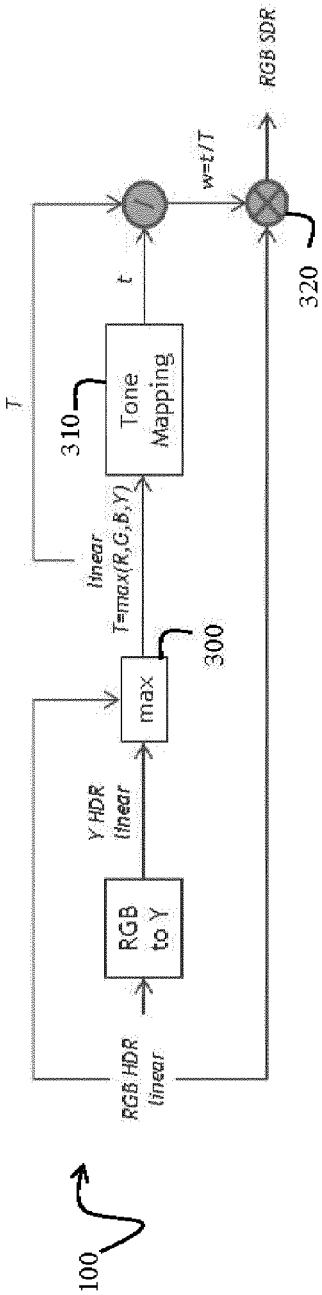
Figure 12:
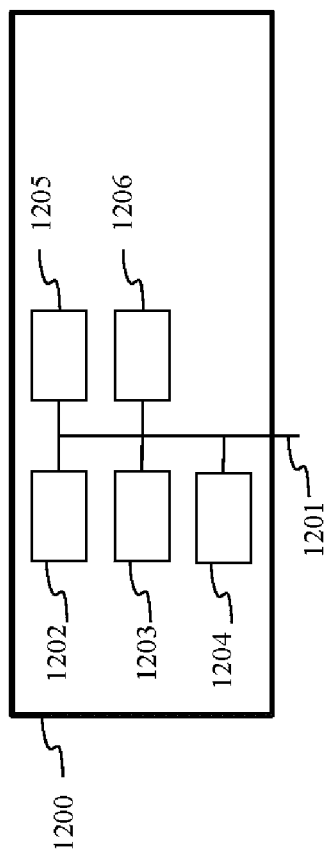
Figure 13:
Figure 14:

FIG. 4-5 illustrated how to determine a modulation value;

FIG. 6 shows a diagram of the steps of the method for inverse-tone-mapping an input picture in accordance with an example of the present principles;

FIG. 7 illustrates the overall method for encoding HDR content in accordance with an example of the present principles;

FIG. 8 illustrates the overall method for decoding HDR content in accordance with an example of the present principles;

FIG. 9 shows the sub-steps of the dynamic range conversion in accordance with an example of the present principles;

FIG. 10 shows the sub-steps of the inverse dynamic range reduction in accordance with an example of the present principles;

FIG. 11 shows a diagram of the steps of obtaining a linear value t by tone mapping a maximum value T in accordance with an example of the present principles;

FIG. 12 shows an example of an architecture of a device in accordance with an example of present principles; and FIG. 13 shows two remote devices communicating over a communication network in accordance with an example of present principles;

FIG. 14 shows the syntax of a signal in accordance with an example of present principles.

Similar or same elements are referenced with the same reference numbers.

6. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

Figure 2:
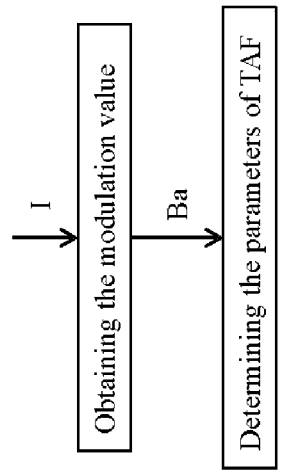
FIG. 2 shows a diagram of the steps of the method for tone-mapping an input picture in accordance with an example of the present principles.

In accordance with the present principles, illustrated in FIG. 2, a method for tone-mapping an input picture I by using a parametric tone-adjustment function TAF comprises determining at least one parameter of the tone-adjustment function TAF responsive to a modulation value Ba, itself responsive to a brightness level of the input picture.

In accordance with a first example of the present principles, illustrated FIG. 1, the tone-adjustment function TAF is the parametric tone-adjustment function given by equations (1), (2) and (3) whose two input parameters shadow-GainControl and midTonesAdjustement are determined from the modulation value Ba as follows:

$$\begin{cases} shadowGainControl = 0.229 + 2.47 * \exp(-0.333 * Ba) \\ midTonesAdjustement = 2.21 * \exp(-0.16 * Ba) \\ highlightGainControl = CST \end{cases} \quad (5)$$

The input parameter highlightGainControl equals a constant value CST, for example CST=2, that do not depends on the modulation value Ba.

In accordance with a variant of the first example, the input parameter highlightGainControl is kept as another parameter in addition to the modulation value Ba.

In accordance with a variant of the first example, the input parameter highlightGainControl depends on the modulation value Ba as follows:

highlightGainControl=2−2*exp(−0.26/$Ba$)

In this first example and its variants, the modulation value Ba is expressed in nits and typically lies in the interval [1, 40].

According to this first example and its variants, the parameters SGC, HGC and MTA are then obtained from these three input parameters according to equation (4).

Figure 1:
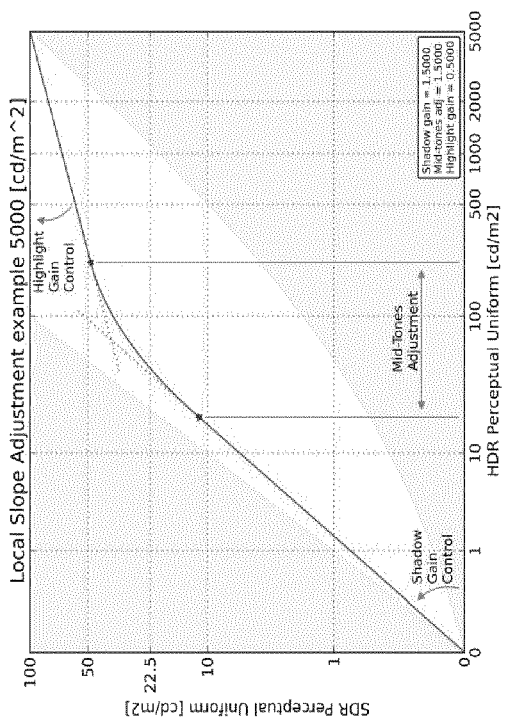
FIG. 1 shows an example of a tone-adjustment function in accordance with prior art.

In accordance with a second example of the present principles, illustrated in FIG. 1, the tone-adjustment function TAF is a parametric tone-adjustment defined on three distinct ranges: the bottom interval, the mid-interval and the upper interval.

Over the bottom interval, the tone adjustment function is linear:

$$y = SGC' * \frac{x}{Ba}$$

with SGC a real parameter value, y an output value and x an input value.

Over the upper interval, the tone adjustment function is also linear:

$$y = HGC' * \frac{x}{Ba} + \left(1 - \frac{HGC'}{Ba}\right)$$

with HGC a slope (real parameter value).

Over the mid-interval, the tone adjustment function is a parabola $$a'\left(\frac{x}{Ba}\right)^2 + b'\frac{x}{Ba} + c'$$

connecting the two linear sections in a smooth cross-over. The width of the cross-over is determined by MTA, a real parameter value.

In brief, the tone adjustment function TAF is defined by:

$$y = \begin{cases} SGC' \cdot \frac{x}{Ba}, 0 \le x \le x'_{SGC} \\ a'\left(\frac{x}{Ba}\right)^2 + b'\frac{x}{Ba} + c', x'_{SGC} < x < x'_{HGC} \\ HGC' \cdot \frac{x}{Ba} + 1 - \frac{HGC'}{Ba}, x'_{HGC} \le x \le 1 \end{cases} \quad (6)$$

where $$\begin{cases} a' = Ba.(-0.5 \cdot SGC' - HGC'.MTA') \\ b' = \frac{Ba - HGC'}{MTA'} + \frac{SGC' + HGC'}{2} \\ c' = \frac{Ba - HGC'}{SGC' - HGC'} + \frac{MTA'}{2} \end{cases} \quad (7)$$

and $$\begin{cases} x'_{SGC} = \frac{B_a - HGC'}{SGC' - HGC'} - \frac{MTA'}{2} \\ x'_{HGC} = \frac{B_a - HGC'}{SGC' - HGC'} - \frac{MTA'}{2} \end{cases} \quad (8)$$

In accordance with a variant of this second example, the parameters SGC', HGC' and MTA' parameter values depend on two input parameter values midTonesAdjustement and highlightGainControl as follows:

$$\begin{cases} expgain = v\left(\frac{L_{source}}{L_{target}}\right) \\ SGC' = expgain \\ HGC' = \frac{highLightGainControl}{4} \\ MTA' = \frac{midTonesAdjustment}{2} \end{cases} \quad (9)$$

with $v(x) = \dfrac{\log\left(1 + (\rho - 1).x^{\frac{1}{\gamma}}\right)}{\log(\rho)}$ and $\rho = 1 + 32.\left(\dfrac{L_{target}}{100000}\right)^{1/\gamma}$ For example, in the above equations, $L_{target}$ is equal to 100 nits, $L_{source}$ is preferably equal to 4000 nits or 5000 nits and v the identity function.

In accordance with a variant of this second example, the input parameters midTonesAdjustement is determined from the modulation value Ba as follows:

$$\begin{cases} midTonesAdjustement = 2.21 * \exp(-0.16 * Ba) \\ highlightGainControl = CST \end{cases}$$

The input parameter highlightGainControl equals a constant value CST, for example CST=2.

In accordance with a variant of the second example, the input parameter highlightGainControl is kept as another parameter in addition to the modulation value Ba.

In accordance with a variant of the second example, the input parameter highlightGainControl depends on the modulation value Ba as follows:

highlightGainControl=2'2*exp(−0.26/Ba)    5

In this second example and its variants, the modulation value Ba is expressed in nits and lies preferably in the interval [1, 40].

In accordance with third example of the present principles, the tone adjustment function TAF is a parametric logarithm defined by:

$$\begin{cases} ba_N = Ba/PeakL \\ N = \log\left(1 + \dfrac{1}{k.ba_N}\right) \\ y = \dfrac{\log\left(1 + \dfrac{x}{k.ba_N}\right)}{N}, \forall x \in [0, 1] \end{cases} \quad (12)$$

where k is a constant value, for example equal to 1000 and PeakL the peak luminance value of the input picture.

Figure 3:
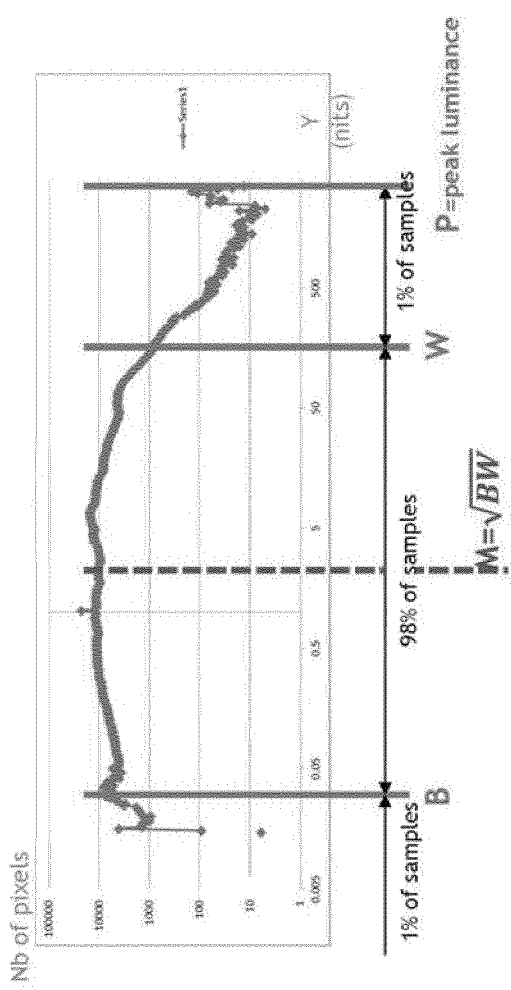
FIG. 3 shows an example of a histogram depending on the linear luminance Y of an input picture in accordance with the prior art.

In according with an example of the present principles, the modulation value Ba is obtained as follows: The pixels of the input picture are classified into a histogram depending on their linear luminance Y, as shown in an exemplary histogram in FIG. 3. As shown in FIG. 3, the rightmost of the histogram is at peak luminance P. This luminance peak is assumed to be provided, for example, based on the picture format, and not to vary from picture to picture when a video is tone-mapped. Next, a white level W is defined as the luminance level corresponding to the last percentile of the histogram, a black level B is defined as the luminance level corresponding to the first percentile of the histogram, and a mid-tone level M is defined as the geometric mean (or logarithmic mean) of the black level B and the white level W:

$$M:=\sqrt{BW} \quad (13)$$

As a consequence, the three levels W, B and M depend on the content of the input picture.

In general, the choice of the modulation value Ba and the tone adjustment function should preserve information at the very dark level and also preserve details in the mid-tone range (i.e., the neighborhood of the mid-tone value). Thus, two conditions are used when deriving the modulation value Ba: (1) the blacks are not clipped down to zero too aggressively; and (2) the number of codewords in the SDR picture used to represent the mid-tone range of the input image is maximized.

Considering the first condition that blacks should not be clipped down to zero too aggressively, a lower bound for the black level is set, i.e., $$\pi_{Ba}(B) \geq \varepsilon \quad (14)$$

where $\pi_{Ba}(.)$ is the tone-adjustment function, B a luminance value and ε is a parameter value.

In FIG. 4, an exemplary a tone-adjustment function $\pi_{Ba}$ is used to illustrate that the mapped value $\pi_{Ba}(B)$ is set to ε. The inequality (14) does not determine a specific modulation value Ba. Instead, it provides a range of acceptable modulation values for Ba.

For the second condition (the number of codewords used to encode the mid-tone range should be maximized), the slope for the tone-adjustment function $\pi_{Ba}$ at the mid-tone level M is maximized as shown in FIG. 5.

Combining both conditions, the modulation value Ba can be uniquely determined by solving the following maximization problem:

$$Ba = \mathrm{argmax}_{\{Ba' \; s.t. \; \pi_{Ba'}(B) \geq \varepsilon\}} \dfrac{\partial \pi_{Ba'}}{\partial \ln Y}(M). \quad (15)$$

To solve the optimization problem (15) given a tone-adjustment function, a systematic brute-force search of Ba in the range of acceptable Ba values may be performed to compute the modulation value Ba for each picture of a video for example. The tone-adjustment function can be the one illustrated in FIG. 1, and the present principles can be applied to any other forms of tone-adjustment function. In Eq. (15), a log-scale is used for luminance Y as it may represent the human luminance perception better than the linear domain. In a variation, one may determine the slope based on Y instead of ln Y for simplicity.

In other examples of the present principles, different methods can be used to determine the modulation value, for example, but not limited to, using an average, median, minimum or maximum value of the luminance of the picture I. These operations may be performed in the linear luminance domain or in a non-linear domain such as ln(I) or $I^\gamma$ with γ<1.

To further improve the tone-adjustment functions (curves), some bounds can be imposed on the modulation value Ba in order to avoid over-shooting in both very dark frames (Ba too low) and very bright frames (Ba too high). For example, the modulation value Ba is set to $$Ba_{att} = \mathrm{Clip}_{[Ba_{min}, Ba_{max}]} Ba_{mid} + \sigma(Ba - Ba_{mid}) \quad (16)$$

to determine an attenuated modulation value $Ba_{att}$, with visually determined values $Ba_{min}$=2 nits, $Ba_{max}$=50 nits, $Ba_{mid}$=5 nits and the attenuation factor σ=0.5. This may provide modulation values closer to visually optimal ones.

In a video sequence, a modulation value Ba may be determined for each picture of said video sequence. In order to avoid temporal inconsistency in scenes with rapid brightness changes, a temporal stabilization is desirable. Fast changing videos, like a scene showing an explosion or fireworks, may cause modulation values to vary rapidly from picture to picture and cause annoying illumination effects. For instance, assuming a scene with a static background and a sudden flash (like an explosion or fireworks) in the foreground may provide annoying visual artefacts. In such cases, due to the flash, the white W will increase, as well as M and then the modulation value Ba. When the modulation value Ba is high, the tone-adjustment function suppress the dark more, and this may induce an unexpected sudden darkening of the background in the tone-adjusted picture. To prevent such an unnatural and annoying temporal variation of the luminosity in the tone-adjusted video sequence, temporal stabilization is proposed to smooth the overall luminosity variation of the video sequence.

In accordance with an example of the present principles, an exponential stabilization is used.

Let $Ba^n$ be the modulation determined at picture n, and $Ba^{t,n}$ the modulation value after temporal stabilization. The exponential temporal stabilization is then given by:

$$Ba^{t,n} = \lambda Ba^n + (1-\lambda) Ba^{t,n-1} \quad (17)$$

with λ a real value adapted to the picture rate.

Other temporal smoothing filters may be used for temporal stabilizing the modulation values.

In accordance with an example of the principles, the method further comprises transmitting the modulation value Ba and possibly the input parameter highlightGainControl in a bitstream.

For example, the modulation value Ba and possibly the input parameter highlightGainControl is (are) encoded as a metadata contained in an adhoc SEI message [*Technicolor's response to CfE for HDR and WCG (category 1)—Single layer HDR video coding with SDR backward compatibility, ISO/IEC JTC1/SC29/WG11 MPEG2014/M36263 June 2015, Warsaw, Poland*].

In accordance with the present principles, illustrated in FIG. 6, a method for inverse-tone-mapping a tone-mapped version of an input picture I by using a parametric inverse-tone-adjustment function ITAF. Said parametric inverse-tone-adjustment function ITAF is the inverse of the tone-adjustment function TAF described above.

Said method for inverse-tone-mapping comprises obtaining a modulation value Ba responsive to a brightness level of the input picture I, and obtaining at least one parameter of the inverse-tone-adjustment function ITAF responsive to said modulation value Ba.

In according with an example of the present principle, when the tone adjustment function TAF is defined by equation (1) and its parameters by equations (2), (3) and (4) (first example or one of its variants), the inverse-tone-adjustment function ITAF is obtained as the reciprocal function of the tone adjustment function depicted in equation (1) as follows:

$$y = \begin{cases} x/SGC, & 0 \le x \le xsgcInv \\ (\sqrt{4ax - 4ac + b^2} - b)/2a, & xsgcInv < x < xhgcInv \\ (x++HGC - 1)/HGC, & xhgcInv \le x \le 1 \end{cases}$$

with $xsgcInv = xsgc * SGC$ $xhgcInv = (HGC * xhgc + 1.0 - HGC)$ and where SGC, HGC are given by equation (4).

In according with an example of the present principle, when the tone adjustment function TAF is defined by equation (6) (second example) and its parameters by equations (7), (8) and (9), the inverse-tone-adjustment function ITAF is obtained as the reciprocal function of the tone adjustment function depicted in equation (8) as follows:

$$y = \begin{cases} Ba.x/SGC', & 0 \le x \le xsgcInv' \\ Ba.(\sqrt{4a'x - 4a'c' + b'^2} - b')/2a', & xsgcInv' < x < xhgcInv' \\ (Ba.x + HGC' - Ba.)/HGC', & xhgcInv' \le x \le 1 \end{cases}$$

with $xsgcInv' = xsgc' * \dfrac{SGC'}{Ba}$ $xhgcInv' = \dfrac{HGC' * xhgc' + Ba - HGC'}{Ba}$ and where SGC', HGC' are given by equation (9).

In according with an example of the present principles, when the tone adjustment function is defined by equation (7) (third example), the inverse-tone-adjustment function ITAF is defined as follows:

$ba_N = Ba/PeakL$ $N = \log(1 + 1/(k.ba\_N))$

InverseToneAdjustment$(x) = k.ba_N.(e^{x.N} - 1), \forall x \in [0,1]$

The tone-adjustment function (and inverse-tone-adjustment function) may be used in any encoding/decoding scheme that requires a tone-mapping (inverse-tone-mapping) processing.

For example, The HDR/WCG encoding/decoding scheme as requires by the Mpeg HDR/WCG Call For Evidence (*Call for Evidence (CfE) for HDR and WCG Video Coding, ISO/IEC JTC1/SC29/WG11 MPEG2014/N15083, February 2015, Geneva, Switzerland*) defines two types of requirements. First type is HDR compression performance, i.e. HDR visual quality as a function of the coded bitrate. Second type of requirement is backward compatibility, i.e. the ability to provide a compressed video bit-stream that can be decoded and displayed with existing legacy equipment, while provided an SDR (Standard Dynamic Range) picture (video) that is viewable as is, without any further processing.

FIG. 7 illustrates the overall method for encoding HDR content which provides both HDR compression and SDR backward compatibility features (*Philips HDR proposal Dynamic range conversion in relation to the "Unified Model" as discussed in SMPTE DG "Dynamic Metadata for Color Transforms of HDR and WCG Images*" R. Nijland Koninklijke Philips N.V. 20150421).

The method comprises a dynamic conversion step 100, which transforms the input linear HDR ($R_{HDR}, G_{HDR}, B_{HDR}$) picture, into a SDR linear RGB picture, noted ($R_{SDR}, G_{SDR}, B_{SDR}$). The input HDR picture is linear light, with a peak luminance preferably given by Mastering Display Max Lum metadata (SMPTE ST 2086). The output ($R_{SDR}, G_{SDR}, B_{SDR}$) linear light picture is SDR, hence has a peak luminance equal to 100 nits. Next steps consist in gamma correcting (step 110), conforming to inverse EOTF of recommendation 1886, color space transforming (step 120), which provides Y'CbCr output picture which is encoded into a coded video stream F (step 130).

FIG. 8 illustrates the overall method for decoding HDR content.

The method comprises decoding a coded video stream F to obtain a decoded Y'CbCr picture (step 200), an inverse color space transforming (step 210), which provides R'G'B' picture from a decoded Y'CbCr picture, an inverse gamma correcting (step 220) to obtain a SDR linear RGB picture from the R'G'B' picture, and an inverse dynamic reduction (step 230), which transforms the SDR linear RGB picture, noted ($R_{SDR}, G_{SDR}, B_{SDR}$) into the input HDR picture, notes ($R_{HDR}, G_{HDR}, B_{HDR}$).

The steps 210, 220 and 230 execute reciprocal operations of the steps 120, 110 and 100 respectively.

FIG. 9 shows the sub-steps of the dynamic range conversion (step 100).

As can be seen, the step 100 consists, for each pixel p of the input picture, in computing (step 300) a maximum value T(p) from the component values of each pixel of the input HDR picture ($\alpha. R_{HDR}, \beta. G_{HDR}, \gamma. B_{HDR}, \gamma. Y_{HDR}$) where ($\alpha, \beta, \gamma, \delta$) are fixed weighting factors, typically all equal to 1, obtaining (step 310) a linear value t(p) by tone mapping said maximum value T(p), and multiplying (step 320) the component values of each pixel p of the input HDR picture by a ratio $$w(p) = \dfrac{t(p)}{T(p)}$$

between the linear value t(p) over the maximum value T(p).

Then the ratio is computed and commonly applied as a multiplicative tone mapping factor onto input ($R_{HDR}$, $G_{HDR}$, $B_{HDR}$) component values, to provide linear light tone mapped RGB values:

$$\begin{pmatrix} R_{SDR} \\ G_{SDR} \\ B_{SDR} \end{pmatrix} = w(p) \cdot \begin{pmatrix} R_{HDR} \\ G_{HRD} \\ B_{HDR} \end{pmatrix}$$

FIG. 10 shows the sub-steps of the inverse dynamic range reduction (step 230).

As can be seen, the step 230 consists in obtaining computing (step 400) a maximum value t(p) from the component values of each pixel of the SDR linear RGB picture, noted ($R_{SDR}$, $G_{SDR}$, $B_{SDR}$), obtaining (step 410) a non-linear value T(p) by inverse-tone mapping the maximum value t(p), and multiplying (step 420) the component values of each pixel of the decoded Y'CbCr picture by a ratio $$w(p)^{-1} = \frac{T(p)}{t(p)}$$

between the non-linear value T(p) over the maximum value t(p).

FIG. 11 shows a diagram of the steps of obtaining (step 410) a linear value t(p) by tone mapping a maximum value T(p) in accordance with an example of the present principles.

In step 500, a non-linear value nt(p) is obtained by transferring the linear value t(p) into a non-linear perceptual domain. To do that, a perceptual curve is used, for instance inverse EOTF of recommendation SMPTE 2084 (High Dynamic Range Electro-Optical Transfer Function of Mastering Reference ST 2084:2014), or the transfer function proposed by Philips in (*Philips HDR proposal Dynamic range conversion in relation to the "Unified Model" as discussed in SMPTE DG "Dynamic Metadata for Color Transforms of HDR and WCG Images*" R. Nijland Koninklijke Philips N.V. 20150421).

In step 520, the non-linear value nt(p) is reshaped so as to adapt it to the desired brightness or darkness level of the output picture ($R_{SDR}$, $G_{SDR}$, $B_{SDR}$). This is the so-called "Local Slope Adjustment" process which allows producing an output SDR tone mapped picture with a desired level of brightness for backward compatibility matters. In other words, the higher the curve, the brighter the produced SDR picture. Moreover, the SDR picture gets darker when the Local Slope Adjustment curve gets closer to the Identity function ($\forall x \in [0,1]$, f(x)=x).

According to the present principles, the "Local Slope Adjustment" process uses the tone-mapping as described in relation with FIGS. 1-5. In other words, the "Local Slope Adjustment" process employs a tone adjustment function parametrized by parameters that need to be chosen. According to the present principles, at least one parameter of the Local Slope Adjustment curve is responsive to a modulation value, itself responsive the brightness level of the input picture as described above. This is a simplified way to parametrize (hence configure and tune) a tone adjustment process within a HDR video compression chain that includes HDR-to-SDR tone mapping, where the mapped SDR picture is intended to be backward compatible with legacy displays. This further provides way to derive automatically a good SDR backward compatible picture, while keeping good compression efficiency.

In step 530, the linear value t(p) is obtained by applying the inverse of the perceptual transfer function to the non-linear value nt(p). The inverse of the perceptual transfer function is configured with an output peak luminance equal to 100 nits.

The decoder 200 is configured to decode data which have been encoded by the encoder 130. The encoder 130 (and decoder 200) may be block-based processing.

The encoder 130 (and decoder 200) is not limited to a specific encoder/decoder which may be, for example, an image/video coder with loss like JPEG, JPEG2000, MPEG2, HEVC recommendation ("*High Efficiency Video Coding*", SERIES H: AUDIOVISUAL AND MULTIMEDIA SYSTEMS, Recommendation ITU-T H.265, Telecommunication Standardization Sector of ITU, April 2013) or H264/AVC recommendation ("*Advanced video coding for generic audiovisual Services*", SERIES H: AUDIOVISUAL AND MULTIMEDIA SYSTEMS, Recommendation ITU-T H.264, Telecommunication Standardization Sector of ITU, February 2014)).

On FIG. 1-11, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 12 represents an exemplary architecture of a device 1200 which may be configured to implement a method described in relation with FIG. 1-11.

Device 1200 comprises following elements that are linked together by a data and address bus 1201:
- a microprocessor 1202 (or CPU), which is, for example, a DSP (or Digital Signal Processor);
- a ROM (or Read Only Memory) 1203;
- a RAM (or Random Access Memory) 1204;
- an I/O interface 1205 for reception of data to transmit, from an application; and
- a battery 1206

In accordance with an example, the battery 1206 is external to the device. In each of mentioned memory, the word «register» used in the specification can correspond to area of small capacity (some bits) or to very large area (e.g. a whole program or large amount of received or decoded data). The ROM 1203 comprises at least a program and parameters. The ROM 1203 may store algorithms and instructions to perform techniques in accordance with present principles. When switched on, the CPU 1202 uploads the program in the RAM and executes the corresponding instructions.

RAM 1204 comprises, in a register, the program executed by the CPU 1202 and uploaded after switch on of the device 1200, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the picture I is obtained from a source. For example, the source belongs to a set comprising:
- a local memory (1203 or 1204), e.g. a video memory or a RAM (or Random Access Memory), a flash memory, a ROM (or Read Only Memory), a hard disk;
- a storage interface (1205), e.g. an interface with a mass storage, a RAM, a flash memory, a ROM, an optical disc or a magnetic support;
- a communication interface (1205), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded picture Î is sent to a destination; specifically, the destination belongs to a set comprising:
- a local memory (1203 or 1204), e.g. a video memory or a RAM, a flash memory, a hard disk;
- a storage interface (1205), e.g. an interface with a mass storage, a RAM, a flash memory, a ROM, an optical disc or a magnetic support;
- a communication interface (1205), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the coded video stream F is sent to a destination. As an example, the stream F is stored in a local or remote memory, e.g. a video memory (1204) or a RAM (1204), a hard disk (1203). In a variant, one or both bitstreams are sent to a storage interface (1205), e.g. an interface with a mass storage, a flash memory, ROM, an optical disc or a magnetic support and/or transmitted over a communication interface (1205), e.g. an interface to a point to point link, a communication bus, a point to multipoint link or a broadcast network.

In accordance with examples of decoding or decoder, the stream F is obtained from a source. Exemplarily, the stream is read from a local memory, e.g. a video memory (1204), a RAM (1204), a ROM (1203), a flash memory (1203) or a hard disk (1203). In a variant, the bitstream is received from a storage interface (1205), e.g. an interface with a mass storage, a RAM, a ROM, a flash memory, an optical disc or a magnetic support and/or received from a communication interface (1205), e.g. an interface to a point to point link, a bus, a point to multipoint link or a broadcast network.

In accordance with examples, device 1200 being configured to implement a method described in relation with FIG. 1-6, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 1200 being configured to implement an encoding method described in relation with FIG. 7, 9 or 11, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 60 being configured to implement a decoding method described in relation with FIG. 8 or 10, belongs to a set comprising:
- a mobile device;
- a communication device;
- a game device;
- a set top box;
- a TV set;
- a tablet (or tablet computer);
- a laptop;
- a display and
- a decoding chip.

According to an example of the present principles, illustrated in FIG. 13, in a transmission context between two remote devices A and B over a communication network NET, the device A comprises a processor in relation with memory RAM and ROM which are configured to implement a method for encoding an picture as described in relation with the FIG. 7 and the device B comprises a processor in relation with memory RAM and ROM which are configured to implement which are configured to implement a method for decoding as described in relation with FIG. 8.

In accordance with an example, the network is a broadcast network, adapted to broadcast still pictures or video pictures from device A to decoding devices including the device B.

A signal, intended to be transmitted by the device A, carries the stream F. The stream F comprises a modulation value Ba responsive to a brightness level of the input picture and intended to be used to determine a parameter of an inverse-tone-mapping method as explained before. Optionally, The stream F further comprises the input parameter highlightGainControl.

FIG. 14 shows an example of an example of the syntax of such a signal when the data are transmitted over a packet-based transmission protocol. Each transmitted packet P comprises a header H and a payload PAYLOAD. A bit of the header H, for example, is dedicated to represent the information data indicating that the encoded luminance block represents the sum of the luminance component of a picture block and a representation of an average value of said luminance component.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for tone-mapping an input picture by using a parametric tone-adjustment function described over multiple ranges, at least one parameter of the tone-adjustment function being associated with each range, wherein the method comprises:
   determining a non-linear tone adjustment function over at least one range according to a modulation value responsive to the brightness level; and
   determining a parameter of the tone-adjustment function according to the modulation value, wherein the modulation value is responsive to a mid-tone level of the input picture determined from a black level and a white level, wherein the black level and the white level are based on content of the input picture.

2. The method of claim 1, wherein the method further comprises determining another parameter of the tone-adjustment function according to an increasing concave function taking into account a brightness level of the input picture.

3. The method of claim 1, wherein the tone adjustment function is linear over a first range, parabolic over a second range and linear over a third range.

4. The method of claim 3, wherein the tone adjustment function is described:
   over the first range by:

$$y=SGC*x$$

where SGC is a real parameter value, y is an output value, and x is an input value;
   over the second range by:

$$ax^2+bx+c, x_{SGC} < x < x_{HGC}$$

over the third range by:

$$y=HGC*x+(1-HGC)$$

where HGC is a slope; and
   where $$\begin{cases} a = -0.5 \cdot SGC - HGC\ MTA \\ b = \dfrac{1-HGC}{MTA} + \dfrac{SGC+HGC}{2} \\ c = \dfrac{1-HGC}{SGC-HGC} + \dfrac{MTA}{2} \end{cases}$$

-continued $$\begin{cases} x_{SGC} = \frac{1-HGC}{SGC-HGC} - \frac{MTA}{2} \\ x_{HGC} = \frac{1-HGC}{SGC-HGC} + \frac{MTA}{2} \end{cases}$$

where MTA is a real parameter value and $$\begin{cases} exposure = \frac{shadowGainControl}{4} + 0,5 \\ expgain = v\left(\frac{L_{source}}{L_{target}}\right) \text{ with } v \text{ a function based on } L_{target} \\ SGC = expgain.exposure \\ HGC = \frac{highLightGainControl}{4} \\ MTA = \frac{midTonesAdjustment}{2} \end{cases}$$

with $v(x) = \frac{\log\left(1 + (\rho - 1).x^{\frac{1}{\gamma}}\right)}{\log(\rho)}$ and $\rho = 1 + 32.\left(\frac{L_{target}}{100000}\right)^{1/\gamma}$ where shadowGainControl and midTonesAdjustement are real values given by:

$$\begin{cases} shadowGainControl = 0.229 + 2.47 * \exp(-0.333 * Ba) \\ midTonesAdjustment = 2.21 * \exp(-0.16 * Ba) \end{cases}$$

where highlightGainControl is a real value, and a modulation value Ba is responsive to a brightness level of the input picture.

5. The method of claim 4, wherein the real value highlightGainControl is a constant value.

6. The method of claim 4, wherein the real value highlightGainControl is kept as another parameter in addition to the modulation value.

7. The method of claim 4, wherein the real value highlightGainControl is given by:

highlightGainControl=2−2*exp(−0.26/Ba).

8. The method of claim 4, wherein the modulation value is responsive to a mid-tone level of the input picture.

9. The method of claim 8, wherein the mid-tone level is determined based on a black level and a white level.

10. The method of claim 9, wherein the mid-tone level is determined as one of a geometric mean and a logarithm mean of the black level and the white level.

11. The method of claim 4, wherein the input image is one of a plurality of pictures included in a video sequence, and wherein the determining of the modulation value is performed for each of the plurality of pictures, wherein the modulation values for the plurality of pictures are temporally smoothed.

12. The method of claim 3, wherein the tone adjustment function is described:

over the first range by:

$$y = SGC' * \frac{x}{Ba}$$

where SGC' is a real parameter value, y is an output value, and x is an input value;

over the second range by:

$$y = a'\left(\frac{x}{Ba}\right)^2 + b'\frac{x}{Ba} + c'$$

over the third range by:

$$y = HGC' * \frac{x}{Ba} + \left(1 - \frac{HGC'}{Ba}\right)$$

where HGC' is a slope; and
where $$\begin{cases} a' = Ba.(-0.5 \cdot SGC' - HGC'. MTA') \\ b' = \frac{Ba - HGC'}{MTA'} + \frac{SGC' + HGC'}{2} \\ c' = \frac{Ba - HGC'}{SGC' - HGC'} + \frac{MTA'}{2} \end{cases}$$

$$\begin{cases} x'_{SGC} = \frac{B_a - HGC'}{SGC' - HGC'} - \frac{MTA'}{2} \\ x'_{HGC} = \frac{B_a - HGC'}{SGC' - HGC'} + \frac{MTA'}{2} \end{cases}$$

where MTA' is a real parameter value and $$\begin{cases} expgain = v\left(\frac{L_{source}}{L_{target}}\right) \\ SGC' = expgain \\ HGC' = \frac{highLightGainControl}{4} \\ MTA' = \frac{midTonesAdjustment}{2} \end{cases}$$

with $v(x) = \frac{\log\left(1 + (\rho - 1).x^{\frac{1}{\gamma}}\right)}{\log(\rho)}$ and $\rho = 1 + 32.\left(\frac{L_{target}}{100000}\right)^{1/\gamma}$ where midTonesAdjustement is a real value given by:

$$\begin{cases} midTonesAdjustment = 2.21 * \exp(-0.16 * Ba) \\ highlightGainControl = CST \end{cases}$$

where highlightGainControl is a real value, and a modulation value Ba is responsive to a brightness level of the input picture.

13. The method of claim 12, wherein the real value highlightGainControl is a constant value.

14. The method of claim 12, wherein the real value highlightGainControl is kept as another parameter in addition to the modulation value.

15. The method of claim 12, wherein the real value highlightGainControl is given by:

highlightGainControl=2−2*exp(−0.26/Ba).

16. The method of claim 1, wherein the tone-adjustment function is a parametric logarithm function described by:

$$ba_N = Ba/PeakL$$

$$N = \log\left(1 + \frac{1}{k \cdot ba_N}\right)$$

$$y = \frac{\log\left(1 + \frac{x}{k \cdot ba_N}\right)}{N}, \forall x \in [0, 1]$$

where k is a constant value, y is an output value, x is an input value, and PeakL is the peak luminance value of the input picture.

17. A method for encoding an input picture comprising:
obtaining a maximum value from component values of the input picture;
obtaining a linear value by tone-mapping the maximum value according to the method of claim 1;
multiplying the input picture by a ratio of the linear value over the maximum value.

18. A method for inverse-tone-mapping a tone-mapped version of an input picture by using a parametric inverse-tone-adjustment function described over multiple ranges, at least one parameter of the tone-adjustment function being associated with each range, wherein the method comprises:
determining a non-linear tone adjustment function over at least one range according to a modulation value responsive to the brightness level, and obtaining a parameter of the inverse-tone-adjustment function according to the modulation value, wherein the modulation value is responsive to a mid-tone level of the input picture determined from a black level and a white level, wherein the black level and the white level are based on content of the input picture.

19. A method for decoding a picture comprising:
obtaining a maximum value from the component values of a decoded picture;
obtaining a non-linear value by inverse-tone-mapping the maximum value according to the method of claim 18;
multiplying the decoded picture by a ratio of the non-linear value over the maximum value.

20. A device for tone-mapping an input picture by using a parametric tone-adjustment function described over multiple ranges, at least one parameter of the tone-adjustment function being associated with each range, wherein the device comprises:
a processor configured to determine a non-linear tone adjustment function over at least one range according to a modulation value responsive to the brightness level, and to determine a parameter of the tone-adjustment function according to the modulation value, wherein the modulation value is responsive to a mid-tone level of the input picture determined from a black level and a white level, wherein the black level and the white level are based on content of the input picture.

21. A device for encoding an input picture comprising a processor configured to:
obtain a maximum value from the component values of the input picture;
obtain a linear value by tone-mapping the maximum value by:
determining a non-linear tone adjustment function over at least one range of a plurality of ranges of a tone-adjustment function according to a modulation value responsive to the brightness level, wherein at least one parameter of the tone-adjustment function is associated with each range of the plurality of ranges; and
determining a parameter of the tone-adjustment function according to the modulation value, wherein the modulation value is responsive to a mid-tone level of the input picture determined from a black level and a white level, wherein the black level and the white level are based on content of the input picture;
multiply the input picture by a ratio of the linear value over the maximum value.

22. A device for decoding a picture comprising a processor configured to:
obtain a maximum value from the component values of a decoded picture;
obtain a non-linear value by inverse-tone-mapping the maximum value by:
determining a non-linear tone adjustment function over at least one range of a plurality of ranges of an inverse-tone-adjustment function according to a modulation value responsive to the brightness level, wherein at least one parameter of the inverse-tone-adjustment function is associated with each range of the plurality of ranges; and
obtaining a parameter of the inverse-tone-adjustment function according to the modulation value, wherein the modulation value is responsive to a mid-tone level of the input picture determined from a black level and a white level, wherein the black level and the white level are based on content of the picture;
multiply the decoded picture by a ratio of the non-linear value over the maximum value.

23. A non-transitory computer-readable storage medium comprising instructions that cause a computing device to perform:
determining a non-linear tone adjustment function over at least one range of a plurality of ranges of a tone-adjustment function according to a modulation value responsive to the brightness level, wherein at least one parameter of the tone-adjustment function is associated with each range of the plurality of ranges;
determining a parameter of the tone-adjustment function according to the modulation value, wherein the modulation value is responsive to a mid-tone level of the input picture determined from a black level and a white level, wherein the black level and the white level are based on content of an input picture; and
tone-mapping the input picture by applying the parametric tone-adjustment function.

24. A device for inverse-tone-mapping a tone-mapped version of an input picture by using a parametric inverse-tone-adjustment function described over multiple ranges, wherein at least one parameter of the inverse-tone-adjustment function is associated with each range, wherein the device comprises a processor configured to determine the inverse-tone-adjustment function as an inverse of a non-linear parametric tone-adjustment function described over at least one range according to a modulation value, wherein a parameter of the non-linear parametric tone-adjustment function is determined according to a modulation value, wherein the modulation value is derived from a mid-tone level of the input picture determined from a black level and a white level, wherein the black level and the white level are based on content of the input picture.

* * * * *